(12) United States Patent
Klaubauf et al.

(10) Patent No.: US 7,734,495 B2
(45) Date of Patent: Jun. 8, 2010

(54) METHODS AND SYSTEM FOR ALLOCATING SHELF SPACE

(75) Inventors: Christine M. Klaubauf, Kaukauna, WI (US); Jeff Lindsay, Appleton, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 1843 days.

(21) Appl. No.: 10/128,533

(22) Filed: Apr. 23, 2002

(65) Prior Publication Data
US 2003/0200129 A1 Oct. 23, 2003

(51) Int. Cl.
G06F 17/18 (2006.01)
(52) U.S. Cl. .................................. 705/10; 705/7
(58) Field of Classification Search ............ 705/10
See application file for complete search history.

(56) References Cited

U.S. PATENT DOCUMENTS

| | | | |
|---|---|---|---|
| 5,047,614 A | | 9/1991 | Bianco |
| 5,050,769 A * | | 9/1991 | Levasseur ................. 221/1 |
| 5,630,068 A | | 5/1997 | Vela et al. |
| 5,765,143 A | | 6/1998 | Sheldon et al. |
| 5,809,145 A | | 9/1998 | Slik et al. |
| 6,035,280 A | | 3/2000 | Christensen |
| 6,089,453 A | | 7/2000 | Kayser et al. |
| 6,161,122 A * | 12/2000 | | Hawkes ................. 709/203 |
| 6,341,269 B1 * | | 1/2002 | Dulaney et al. ............ 705/22 |
| 6,366,890 B1 * | | 4/2002 | Usrey ..................... 705/10 |
| 2002/0087385 A1 * | | 7/2002 | Vincent ................... 705/10 |
| 2002/0121979 A1 * | | 9/2002 | Smith ................... 340/572.1 |
| 2002/0133479 A1 * | | 9/2002 | Dippold ..................... 707/1 |
| 2003/0014291 A1 * | | 1/2003 | Kane et al. .................. 705/8 |
| 2003/0055707 A1 * | | 3/2003 | Busche et al. ............. 705/10 |
| 2003/0083925 A1 * | | 5/2003 | Weaver et al. ............. 705/10 |
| 2003/0171979 A1 * | | 9/2003 | Jenkins ................... 705/10 |

FOREIGN PATENT DOCUMENTS

| WO | WO 00/43934 A1 | 7/2000 |
|---|---|---|
| WO | WO 00/58891 A1 | 10/2000 |

OTHER PUBLICATIONS

Urban, Timothy L., "An Inventory-Theoretic Approach to Product Assortment and Shelf-Space Allocation", 1998, New York University, Journal of Retailing, vol. 74(1).*

Borin et al. "A Model for Determining Retail Product Category Assortment and Shelf Space Allocation," Decision Sciences. May/Jun. 1994. vol. 25, No. 3. p. 359-384.*

(Continued)

Primary Examiner—Beth V. Boswell
Assistant Examiner—Justin M Pats
(74) Attorney, Agent, or Firm—Armstrong Teasdale LLP

(57) ABSTRACT

A method and system for the collection of consumer sales data for use in intelligent management of shelf space in a retail environment based on quantitative analysis of consumer sales data in which interactions between two or more products are quantitatively applied in estimating sales for a particular selection of the shelf space location and/or shelf space amount. Such management may be achieved manually or automatically with the invention.

22 Claims, 2 Drawing Sheets

OTHER PUBLICATIONS

Dreze et al., Shelf Management and Space Elasticity, Graduate School of Business, The University of Chicago, Jan. 1994, p. 1-41.*

Shelf Logic Planogramming, shelflogic.com, retrieved from web.archive.org, Nov. 2001, p. 1-10.*

ACNielsen Web Pages, "ACNielsen Launches New Version of Shelf Builder"—Dated Sep. 23, 1997, available Jul. 18, 2002 at http://acnielsen.com/news/american/us/1997/19970923.htm.

ACNielsen Web Pages, "Benefits and Features", copyright 1995-2002, a available Jul. 18, 2002 at http://acnielsen.com/products/tools/shelfbuilder/features.htm.

ACNielsen Web Pages, Milton Merl and Marshall White, "The Assortment Challenge: Marrying Supply Cost with Consumer Demand"—Dated Sep. 1999, available Jul. 18, 2002 at http://acnielsen.com/pubs/ci/1999/q3/features/assort.htm.

* cited by examiner

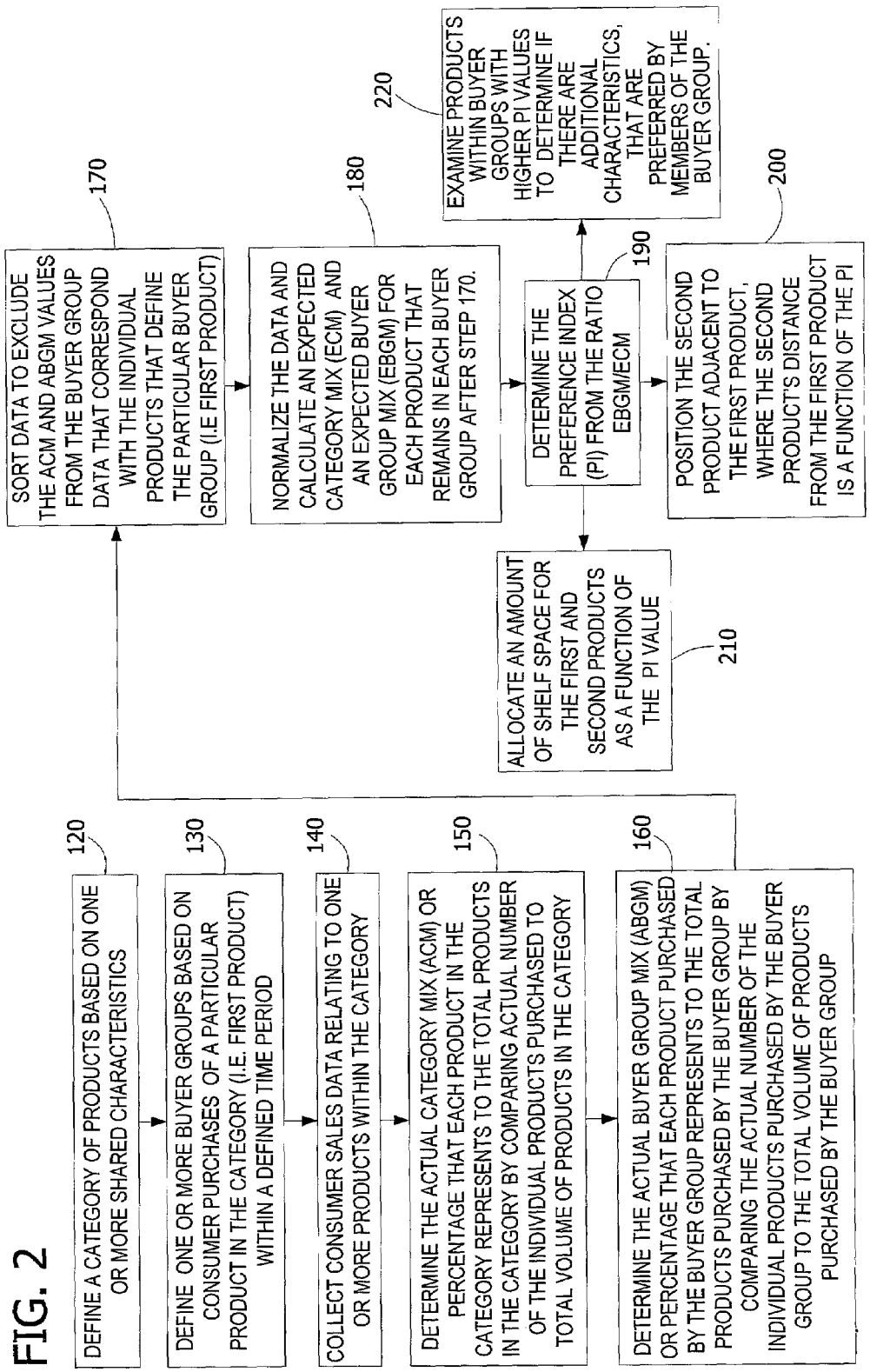

METHODS AND SYSTEM FOR ALLOCATING SHELF SPACE

FIELD OF THE INVENTION

The present invention relates to a method and system for managing retail shelf space. In particular, this invention relates to a method and system for the intelligent management of product distribution on retail shelves, by allocating shelf space as a function of consumer preferences.

BACKGROUND OF THE INVENTION

In the past, the allocation of shelf space between products has been substantially fixed over short intervals of time, with adjustments being made largely by manual processes, including negotiations with manufacturers. Further, the information used to justify space allocation schemes and arrangement has been subject to numerous subjective processes, often resulting in decisions of questionable validity. While many efforts have been made to model sales as a function of shelf space and other factors, there is a need for a method and system for making objective decisions making shelf space allocation based on consumer data in which product interactions are considered and quantified.

A variety of tools and techniques have been applied in the past to assist retailers in planning shelf space allocation. For example, AC Nielsen offers a software tool, Shelf Builder, to assist in planning shelf space allocation. However, it does not appear to address the decision making process or apply household data to analyze a proposed design. Web sites, such as http://acnielsen.com/news/american/us/1997/19970923.htm and http://acnielsen.com/products/tools/shelfbuilder/features.htm, provide information about the Shelf Builder software. Other software tools from AC Nielsen include the SPACEMAN Merchandising Central and SPACEMAN Professional packages, in which retail planograms can be integrated with corporate Intranets, point-of-sale data processing, and other retail data to permit analysis of multiple scenarios. A planogram is a diagram that shows how and where retail products should be placed on retail shelves or displays. It further analyzes space utilization, provides financial analysis, along with many other reports that permit retailers and manufacturers to effectively manage their businesses. "Planogramming" is the art of using planogram software, which can also referred to as "space and category management" software. Again, the use of household data to align shelf space allocation with buyer group trends in order to objectively allocate shelf space does not appear to be part of these tools.

Another technique for shelf space analysis is Activity-Based Costing (ABC), as described at http://acnielsen.com/pubs/ci/1999/q3/features/assort.htm. ABC can be defined as: "determining an individual product's profit after all costs, including the resources required to offer the product for sale-such as labor, equipment and building utilities." ABC is useful in accounting for the costs of getting and maintaining an item on shelf, but does not appear applicable to solving the problems of objectively allocating shelf space.

APOLLO™ 7.0 software suite, offered by Information Resources, Inc. (IRI), provides yet another technique. The APOLLO™ 7.0 software suite includes IRI's "Go-To-Shelf Strategy Solution," which is said to help a firm's consumer packaged goods and retailer clients ensure consistent execution of category management plans and new product launches at the shelf by combining store and consumer tracking information with other services. This software is discussed in the article "APOLLO™ 7.0 Premieres at FMI Marketechnics; Helps Ensure Consistent Execution of Category Management Plans," in *Business Wire*, Feb. 25, 1999

In spite of past efforts, there is a need for improved methods and systems of objective shelf space allocation that take decision making processes to a more quantitative or less subjective level, including methods and systems that permit decision making based on automated data analysis methods to optimize the use of shelf space. There is also a need for methods and systems that permit dynamic allocation of shelf space without the need for lengthy manual processes or without being highly subject to subjective factors. Further, in terms of promotions at retailers, such as temporary price discounts or coupon campaigns, shelf space allocations often need to be modified to better meet the demands of a promotion or to meet the sales potential that a promotion can provide. There is, therefore, also a need for an improved and efficient method and system for temporarily adjusting shelf space allocations in response to promotions, seasonal changes, or other foreseeable events to optimize sales, based on quantitative analysis of consumer data.

The invention described below addresses one or more of these and other disadvantages and needs.

SUMMARY OF THE INVENTION

The invention meets the above needs and overcomes the deficiencies of the prior art by providing a system and method for intelligent management of product distribution on retail shelves to increase sales or profits, or to achieve other specified objectives. The system and method resolve the inefficiency and subjectivity problems associated with the decision making process for allocating shelf space, by analyzing consumer sales data and quantifying a preference for a customer who purchases a first product to also purchase one or more products, determining the amount of space to allocate for one or more products as a function of that preference, and determining where to position the one or more products relative to the first as a function of that preference.

In accordance with one aspect of the invention, a method provides for allocating retail shelf space for a category of products based on sales data indicating past transactions of consumers of products in the category. The method includes defining a category of products based on a shared characteristic of the products. The method further includes defining a plurality of buyer groups. Each buyer group is defined based on consumers who purchase one of the products (referred to as a defining product) in the category within a defined time period. The method further includes determining, for each buyer group, a preference for the consumers in each buyer group to purchase each of the other category products other than the defining product of the buyer group (referred to as a second product. The preference is determined as a function as a function of the sales data. The method also includes allocating the retail shelf space based on the preference for the consumers in each buyer group to purchase each of the other category products other than the defining product of the buyer group.

In accordance with another aspect of the invention, a method provides for allocating retail shelf space for a category of products based on sales data indicating past purchases of consumers of products in the category. The method includes defining a category of products based on a shared characteristic of the products. The method further includes defining a plurality of buyer groups. Each group is defined based on consumers who purchase one of the products in the category within a defined time period. The method further includes determining, for each buyer group, a preference for the consumers in each buyer group to purchase each of the other products within the category, other than the product which defines the buyer group. The preference is determined as a function of the sales data. The method further includes predicting a sales impact based on the preference for the consumers in each buyer group to purchase each of the other products within the category, other than the product which defines the buyer group. The method also includes allocating the retail shelf space based on said predicted sales impact.

In accordance with yet another aspect of the invention, a system provides for allocating retail shelf space for a category of products based on sales data indicating past transactions of consumers of products in the category. The system includes data collection instructions for collecting data relating to purchases by a plurality of defined buyer groups from within a defined product category. The product category is defined based on a shared characteristic of the products, and each buyer group is defined based on consumers who purchase one of the products in said category within a defined time period is defined. The system further includes a database for collecting sales data. The system also includes a computer system, which, for each buyer group, determines a preference for the consumers in each buyer group to purchase each of the other category products other than the defining product of the buyer group (referred to as a second product). The preference is determined as a function of the sales data. Furthermore the system provides for allocating the retail shelf space based on the preference for the consumers in each buyer group to purchase each of the other category products other than the defining product of the buyer group.

Alternatively the invention may comprise various other methods and systems. Other objects and advantages will become apparent to those skilled in the art from the detailed description herein read in conjunction with the drawings attached with.

BRIEF DESCRIPTION OF DRAWINGS

FIG. 2 illustrates a preferred technique embodying aspects of the invention for a retail based realization.

Corresponding reference characters indicate corresponding parts throughout the drawings.

DETAILED DESCRIPTION OF PREFERRED EMBODIMENTS

Figure 1:
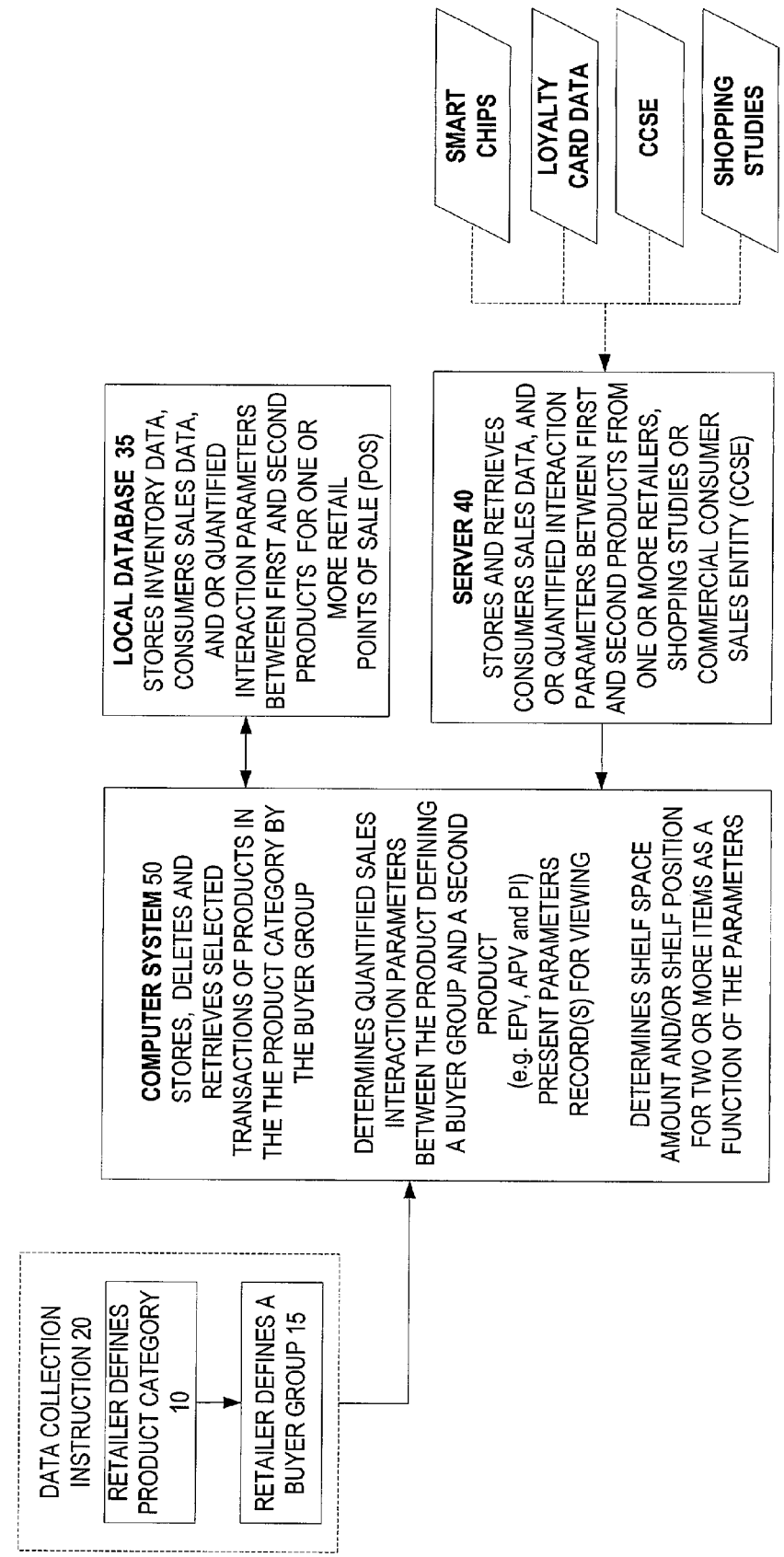
FIG. 1 is a combined flow and block diagram illustrating the components and operations of a preferred embodiment of a method and system of the invention for a retail based realization.

The invention relates to a method and system for the collection of consumer sales data for use in intelligent management of shelf space in a retail environment. As used herein, "intelligent management" of shelf space refers to methods and systems based on quantitative analysis of consumer sales data in which interactions between two or more products are quantitatively applied in estimating sales for a particular selection of the shelf space location and/or shelf space amount. Such management may be achieved manually or automatically with the invention. In one embodiment of the invention, a person, party, company or other entity interested in sales information (herein referred to a "retailer") performs an analysis of consumer sales data and related data sets to quantify interactions between two products that reflect a measurable preference for a consumer who purchases a first product to also purchase a second product (e.g., an interaction between purchasers of disposable diapers and children's toys, or between antibacterial wet wipes and antibacterial dish soap). Preferably, the retailer uses the measured preference to determine an amount of shelf space to provide for the two or more products adjacent to a first product, a physical position to provide two or more products relative to the first product, and/or a common characteristic among the more preferred products of the two or more products.

Referring now to FIG. 1, there is shown a combined flow and block diagram for a preferred embodiment of the method and system for a retail based realization of the invention. The method and system includes a retailer providing data collection instructions 20 to a computer system 50 to retrieve selected transactions of products and/or services in a defined product category 10 by a buyer group 15. The selected transactions are retrieved by computer system 50 from a local database 35 or from a third party source via a server 40. The computer system 50 is further used in plurality of ways to assist retailers in objectively allocating retail shelf space.

As shown in FIG. 1, a retailer defines a product category 10, and a buyer group 15. The retailer defines the product category 10 based on one or more shared characteristics among two or more products. The shared characteristics may include manufacturer name, brand name, packaging type (i.e. shape, color, size), product segment (e.g. tampons, pads, liners), product sub-segment (e.g. thick, traditional, ultrathin), price, product function, intended user age, intended user gender, or any other identifiable classification. For example, feminine hygiene products can define a product category. Alternatively, all feminine hygiene products manufactured by a common manufacturer or common brand name such as KOTEX® can define the product category 10.

The buyer group 15 represents any buyers who have purchased at least one unit of a particular product within the defined product category 10 in the past year (or other selected time period; the period of time is selected to validate or optimize results). For instance, for the product category 10 defined as feminine hygiene products manufactured by Kimberly-Clark Corporation, the buyer group 15 can be defined by buyers who have purchased tampons with the brand name KOTEX® in the past year.

A series 15 exemplary transactions within the product category 10 defined as feminine hygiene products is shown in Table 1. For simplicity, the products within the feminine hygiene product category are identified as A, B, C, D, E, F, and G. The buyer groups shown in Table 1 are identified by the particular product purchased. For example, all buyers that have purchased product A will be identified as buyer group A in which case product A is referred to as the defining product of buyer group A. For purposes of illustration, the remaining portion of this description will follow the exemplary transactions shown in Table 1 to illustrate the invention.

TABLE 1

| Transaction/ | FEMININE HYGIENE PRODUCTS | | | | | | |
|---|---|---|---|---|---|---|---|
| Buyer # | A | B | C | D | E | F | G |
| 1 | X | X | | | | | |
| 2 | X | | X | | | | |
| 3 | | X | X | X | | | |
| 4 | X | X | | X | | | |
| 5 | X | X | | | X | X | |
| 6 | | X | X | | | | X |
| 7 | | | | | X | X | X |
| 8 | | | | X | X | | |
| 9 | | | X | X | X | | X |
| 10 | X | | | | | | X |

TABLE 1-continued

| Transaction/Buyer # | FEMININE HYGIENE PRODUCTS | | | | | | |
|---|---|---|---|---|---|---|---|
| | A | B | C | D | E | F | G |
| 11 | | X | | | X | X | |
| 12 | | | | | | X | X |
| 13 | | X | | | | X | |
| 14 | | X | | | | | X |
| 15 | X | | | | X | X | |

Referring again to FIG. 1, after the retailer has defined the product category 10 and a buyer group 15, the retailer uses data collection instructions 20 to instruct computer system 50. The retailer generates the instructions using, for example, a keyboard and/or software. The computer system 50 is responsive to the data collection instructions and sorts the transaction data according to the defined product category 10 and defined buyer group 15. The transaction data and related data sets are used, as noted below in more detail, to determine and compare interactions between two or more products in a retail environment.

Sales transaction data includes, for example, data sets that have information about particular shelf space arrangements and the associated sales behavior associated with particular shelf space arrangements (e.g., results of marketing research studies that were considered or were focused on the impact of shelf space arrangements on sales). In addition, the sales transaction data can include consumer sales data sets which indicate the relationship between two or more products in terms of consumer purchase patterns. From this relationship, interactions between the two or more products in terms of apparent consumer behavior can be examined and quantified.

Furthermore, the quantified interactions can be used to determine a preference that particular consumers may have to purchase the two or more products. Moreover, the determined preference can be advantageously used in allocating retail shelf space to maximize retail sales. This sales transaction data and related data sets are used, for example, to objectively estimate the effect of a given shelf space arrangement on product sales by measuring a preference for a consumer who purchases a first product to also purchase a second product.

Thus, transaction data relating to purchases in the product category 10 by a buyer group 15 can be used to determine or predict the purchasing behavior of the buyer group 15. Furthermore, a comparison of the purchasing behavior of multiple buyer groups can be examined to validate or reject a particular hypothesis about optimal shelf space allocation. In particular, and as discussed in more detail below, by using purchase data from a database 35, or server 40, to analyze the purchasing behavior of buyer group 15, a Preference Index (PI) can be calculated. The PI indicates the relative preference or lack of preference of members of the buyer group 15, to purchase each of the other products within the category, other than the product which defines the buyer group. The defining product of the buyer group is referred to as a first product, and each of the other products within the category are a potential second product. By evaluating the PI for multiple buyer groups relative to specific products, product categories, segments, and other groupings of products, meaningful predictions can be made about optimal shelf space groupings. From the transaction data in Table 1, seven buyer groups based on a first product (i.e. A, B, C, D, E, F and G) are identified and shown below in Table 2. Table 2 is a summary of the transactions shown in Table 1, and shows the total volume of transactions in the product category 10, the total volume of transactions for each product in the product category 10, the total volume of products purchased by each buyer group 15, and the volume of each product purchased by each buyer group 15. For example, column C2 shows the total transactions of buyer group A which is all transactions in which product A was purchased. Thus, column C2 is the sum of transactions 1, 2, 4, 5, 10 and 15 from Table 1. Column C2 shows that 15 total products were purchased by buyer group A including 6 of A, 3 of B, 1 of C, 1 of D, 1 of E, 2 of F and 1 G. Column C3-C8 shows similar results for groups B-G. Further, column C1 category totals indicate that a total category volume (TCV) of 40 products were purchased by groups A-G including 6 of A, 8 of Bm 4 of C, 4 of D, 6 of E, 6 of F and 6 of G.

From the data in Table 2, the PI can be calculated to show, for example, the likelihood that members of buyer group B (i.e. B is the first product or defining product), will be likely to purchase product A.

TABLE 2

| | | C1 | C2 | C3 | C4 | C5 | C6 | C7 | C8 |
|---|---|---|---|---|---|---|---|---|---|
| | Hygiene | Category | | | | Buyer Group Summary | | | |
| | Products | Totals | A | B | C | D | E | F | G |
| R1 | Total | TCV = 40 | $TBGPV_A = 15$ | $TBGPV_B = 22$ | $TBGPV_C = 11$ | $TBGPV_D = 12$ | $TBGPV_E = 18$ | $TBGPV_F = 17$ | $TBGPV_G = 16$ |
| R2 | A | $CV_A = 6$ | 6 | 3 | 0 | 1 | 2 | 2 | 1 |
| R3 | B | $CV_B = 8$ | 3 | 8 | 2 | 2 | 2 | 3 | 2 |
| R4 | C | $CV_C = 4$ | 1 | 2 | 4 | 2 | 1 | 0 | 2 |
| R5 | D | $CV_D = 4$ | 1 | 2 | 2 | 4 | 1 | 0 | 1 |
| R6 | E | $CV_E = 6$ | 1 | 2 | 1 | 2 | 6 | 4 | 2 |
| R7 | F | $CV_F = 6$ | 2 | 3 | 0 | 0 | 4 | 6 | 2 |
| R8 | G | $CV_G = 6$ | 1 | 2 | 2 | 1 | 2 | 2 | 6 |
| | Parameters | CV | BGPV | BGPV | BGPV | BGPV | BGPV | BGPV | BGPV |

Referring back to FIG. 1, the computer system 50 is configured to collect sales transaction data for product category 10 and buyer group 15 directly from local database 35 or the server 40.

The sales transaction data is collected from a local database 35. In an alternate embodiment, the information can be collected from the local database manually, for example, by copying the data to a computer readable medium, such as a diskette or CD ROM.

The local database 35 is normally associated with a point of sale (POS) retail location and stores all the essential inventory and/or sales information for that particular retail location. The local database 35 may, for example, be within a computer system 50 that also monitors and tracks sales transactions. However, a local database 35 may also contain essential inventory and/or sales transaction data for a plurality of POS locations. For example, a local database 35 associated with a particular grocery store may also contain information related to other grocery stores belonging to the same chain. The sales data contained on local database 35 may further include, for example, transaction data that has been collected by computer system 50 from server 40. Such transaction data may include commercial consumer sales data (CCSD), such as household panel data with extensive historical sales information (consumer usage patterns) from a pool of consumers, loyalty card data, data obtained from targeted studies of promotions and/or shelf space impact on sales performance, including virtual shopping data in which the purchasing behavior of multiple consumers is studied in a computer-generated environment, and the like. The inventory data may comprise, for example, items purchased, present inventory on the shelves, inventory in a warehouse area, and inventory expected to be delivered or that has been ordered.

In another embodiment, sales transaction data is collected from a third party source via server 40. As indicated above, third party sources include commercial consumer sales data (CCSD), which supply data such as household panel data with extensive historical sales information (consumer usage patterns) from a pool of consumers, loyalty card data, targeted studies of promotions and/or shelf space impact on sales performance, including virtual shopping data in which the purchasing behavior of multiple consumers is studied in a computer-generated environment.

In yet another embodiment, sales transaction data is collected from other retailers via server 40. The server 40 stores and retrieves consumer sales transaction data for groupings of two items for one or more retailers. The sales transaction data collected by server 40 may further comprise, for example, essential inventory and/or information for shelf space arrangements for a plurality of retail POS locations.

Still referring to FIG. 1, the function of the computer system 50 comprises the collection and manipulation of sales transaction data acquired from local database 35 and/or server 40 as a result of the data collecting instructions from the data collection instruction device 20. This overall function is fulfilled through a number of specific functions and operations. The computer system 50 comprises any hardware and software suitable to perform these functions and operations and known to those skilled in the art.

For example, the computer system 50 can comprise one or several computers and/or other computing or electronic devices. These computers and/or devices can be in various physical locations (e.g. at store, client's home, third party, etc.) and may or may not be connected in real time. These computers/devices/systems can be linked and the information between them can be transmitted by any suitable method known to those skilled in the art. In the following description, the encompassing term computer system 50 is used. The main functions and operations of the computer system 50 are described below. Most of these functions will be performed by the system interactively, i.e. with participation of an operator (a retailer or third party consultant, etc). Any suitable user interface known to those skilled in the art can be used to establish this interaction. Some functions can be also performed by the computer system 50 automatically (e.g. after another specified operation), periodically (e.g. with consumer-specified interval), or in a combination of modes.

The computer system 50 further determines quantified sales interaction parameters for the defined product category and the defined buyer group as specified by the retailer. The quantified sales interaction parameters include, for example, an Actual Category Mix (ACM), an Actual Buyer Group Mix (ABGM), a Expected Buyer Group Mix (EBGM), an Expected Category Mix (ECM) for a second product, and a Preference Index (PI). The computer system 50 is further configured to store, delete and retrieve quantified parameters records relating to particular groupings of two or more items.

In one embodiment the, the computer system 50 presents the parameters for viewing and/or printing, such that the retailer can use in determining the amount of shelf space and/or shelf position for two or more products.

More preferably, the computer system 50 automatically determines the amount of shelf space and/or shelf position for two or more products by applying the quantified parameters to an algorithm stored on a computer readable medium.

To calculate the Actual Category Mix (ACM) for each product, computer system 50 retrieves sales transaction data such as shown in Table 1 and 2 relating to the product category 10 and buyer group 15 defined by the retailer. More specifically, computer system 50 determines the total number of product purchases within the product category 10 (TCV or Total Category Volume), and the total number of each product purchased within the product category 10 (category volume for product i=CVi). The computer system 50 divides the $CV_i$ for each product in the product category by the TCV to calculate the ACM for each product. For example, the following algorithm is used to calculate the ACM for each product:

$$ACM_i = CV_i/TCV \qquad (1)$$

Using the data in Table 2, the percentage, or mix, that each product represents to the category is calculated and shown below in Table 3. For example, to calculate the $ACM_B$ for product B, the computer system 50 determines a category volume ($CV_B$) of 8 products (i.e. see cell located at R3 and C1 in Table 2; hereinafter referred to as R3C1), and the total category volume of 40 total products in the feminine hygiene category (R1C1 in Table 2). Thus, the $ACM_B$ for product B is equal to 8/40, or 20%, as shown in R3C1 of Table 3.

To calculate the Actual Buyer Group Mix ($ABGM_i$) for each product of each buyer group 15, computer system 50 determines a total volume of products purchased by each buyer group (total buyer group product volume of group i=$TBGPV_i$), and a total volume of each product purchased by each group (buyer group product i volumes=$BGPV_i$). The computer system 50 divides the BGPV of each product by the $TBGPV_i$ to calculate the ABGM for each product. For example, the following algorithm is used to calculate the ABGM for each product:

$$ABGM_i = BGPV_i/TBGPV_i \qquad (2)$$

Using the data in Table 2, the percentage, or mix, that each product represents to a particular buyer group is calculated and shown below in Table 3. For example to calculate, the ABGM for product B in buyer group A, the computer system determines a buyer group purchase volume of 3 transactions of product B by buyer group A (see R3C2 in Table 2), and a total buyer group product volume of $TBGPV_A$=15 for buyer group A (see R1C2 in Table 2). Thus, the ABGM for product B in buyer group A is equal to 3 divided by 15, or 20%, as shown in R3C2 of Table 3.

TABLE 3

| | | C1 | C2 | C3 | C4 | C5 | C6 | C7 | C8 |
|---|---|---|---|---|---|---|---|---|---|
| | Hygiene | Actual | | | | Actual Buyer Group Mix | | | |
| | Products | Category Mix | A | B | C | D | E | F | G |
| R1 | Total % | $ACM_\tau = 100$ | 100 | 100.0 | 100.0 | 100.0 | 100.0 | 100.0 | 100.0 |
| R2 | A | $ACM_A = 15$ | 40.0 | 13.6 | 0.0 | 8.3 | 11.1 | 11.8 | 6.3 |
| R3 | B | $ACM_B = 20$ | 20.0 | 36.4 | 18.2 | 16.7 | 11.1 | 17.6 | 12.5 |
| R4 | C | $ACM_C = 10$ | 6.7 | 9.1 | 36.4 | 16.7 | 5.6 | 0.0 | 12.5 |
| R5 | D | $ACM_D = 10$ | 6.7 | 9.1 | 18.2 | 33.3 | 5.6 | 0.0 | 6.3 |
| R6 | E | $ACM_E = 15$ | 6.7 | 9.1 | 9.1 | 16.7 | 33.3 | 23.5 | 12.5 |
| R7 | F | $ACM_F = 15$ | 13.3 | 13.6 | 0.0 | 0.0 | 22.2 | 35.3 | 12.5 |
| R8 | G | $ACM_G = 15$ | 6.7 | 9.1 | 18.2 | 8.3 | 11.1 | 11.8 | 37.5 |
| | Parameters | ACM | ABGM | ABGM | ABGM | ABGM | ABGM | ABGM | ABGM |

Although the buyer group is defined based on consumers who purchase one of the products, or first product, in the category, the computer system 50 further segregates data relating to the other products, or second product, purchased by members of the buyer group 15 from product category 10.

Thus, by segregating the data for other products, the computer system 50 can calculate an Expected Category Mix (ECM) for a second product, and an Expected Buyer Group Mix (EBGM) for a second product.

The ECM, EBGM values are buyer group dependant. The ECM is the mix, or percentage, that a particular second product represents to the total number of product purchases within the category after excluding the defining product purchased within the category. Likewise, the EBGM is the mix, or percentage, that a particular second product represents to the total volume of products purchased by the buyer group after excluding the total number of defining products purchased by the buyer group.

To calculate the ECM for a second product, the data in Table 3 is rearranged to exclude the ACM and the ABGM values that correspond to the defining product, or first product. This exclusion allows the examination of the remaining products to determine the buyer group preference for the remaining products. However, as a result, and as illustrated below in Table 4, the percentage will claim change because of this exclusion. For instance, the category mix and buyer group (BG) mix totals for BG A are 85% (see R1C1) and 60% (see R1C2), respectively, when product A is excluded as compared to 100% (R1C1; Table 3) and 100% (R1C2; Table 3) when product A is included. As another example the category mix and (BG) mix totals for BG B are 80% (R1C3; Table 4) and 63.6% (R1C4; Table 4), respectively, when product B is excluded as compared to 100% (R1C1; Table 3) and 100% (R1C3; Table 3) when product B is included. Similarly, the other percentages for the other groups change as well.

TABLE 4

| | | C1 | C2 | C3 | C4 | C5 | C6 | C7 | C8 | C9 | C10 | C11 | C12 | C13 | C14 |
|---|---|---|---|---|---|---|---|---|---|---|---|---|---|---|---|
| | | Pre-Normalized Category Second Product Mix & Pre Normalized Buyer Group Second Product Mix | | | | | | | | | | | | | |
| | | BG A | | BG B | | BG C | | BG D | | BG E | | BG F | | BG G | |
| | Hygiene Products | Cat. Mix | BG Mix | Cat. Mix | BG Mix | Cat. Mix | BG Mix | Cat. Mix | BG Mix | Cat. Mix | BG Mix | Cat. Mix | BG Mix | Cat. Mix | BG Mix |
| R1 | Total % | 85.0 | 60 | 80.0 | 63.6 | 90.0 | 63.7 | 90.0 | 66.7 | 85.0 | 66.7 | 85.0 | 64.7 | 85.0 | 62.5 |
| R2 | A | | | 15.0 | 13.6 | 15.0 | 0.0 | 15.0 | 8.3 | 15.0 | 11.1 | 15.0 | 11.8 | 15.0 | 6.3 |
| R3 | B | 20.0 | 20.0 | | | 20.0 | 18.2 | 20.0 | 16.7 | 20.0 | 11.1 | 20.0 | 17.6 | 20.0 | 12.5 |
| R4 | C | 10.0 | 6.7 | 10.0 | 9.1 | | | 10.0 | 16.7 | 10.0 | 5.6 | 10.0 | 0.0 | 10.0 | 12.5 |
| R5 | D | 10.0 | 6.7 | 10.0 | 9.1 | 10.0 | 18.2 | | | 10.0 | 5.6 | 10.0 | 0.0 | 10.0 | 6.3 |
| R6 | E | 15.0 | 6.7 | 15.0 | 9.1 | 15.0 | 9.1 | 15.0 | 16.7 | | | 15.0 | 23.5 | 15.0 | 12.5 |
| R7 | F | 15.0 | 13.3 | 15.0 | 13.6 | 15.0 | 0.0 | 15.0 | 0.0 | 15.0 | 22.2 | | | 15.0 | 12.5 |
| R8 | G | 15.0 | 6.7 | 15.0 | 9.1 | 15.0 | 18.2 | 15.0 | 8.3 | 15.0 | 11.1 | 15.0 | 11.8 | | |
| | Parameters | ACM | ABGM | ACM | ABGM | ACM | ABGM | ACM | ABGM | ACM | ABGM | ACM | ABGM | ACM | ABGM |

In order to effectively compare the ACM for a particular second product in the category, and the ABGM for a particular second product in the buyer group, the ACM and ABGM values are normalized or re-shared, to yield ECM and EBGM values respectively. By normalizing or re-sharing, and sometimes referred to by those skilled in the art as "fair share indexing", the percentage that each of the remaining products represents to the total remaining products is determined. Furthermore, the normalization allows the effective examination of relationships between buyer groups because each buyer group will have a category mix total and buyer group mix total of 100%. For example, the following algorithms are used to calculate the expected category mix and the expected buyer group mix for a 2nd product in a buyer group:

$$ECM = ACM_{2nd}/(100 - ACM_{1st}); \quad (3)$$

$$EBGM = ABGM_{2nd}/(100 - ABGM_{1st}); \quad (4)$$

where $ACM_{1st}$ is the actual category mix of the product that defines the buyer group, $ACM_{2nd}$ is the actual category mix for the particular second product purchased by the buyer group, $ABGM_{1st}$ is the actual buyer group mix of the product that defines the buyer group, and $ABGM_{2nd}$ is the actual buyer group mix for the second product purchased by the buyer group.

Using the data in Table 4, the ECM and EBGM for each product in each buyer group is calculated and shown below in Table 5. For example, to calculate, the ECM and EBGM for product B for buyer group A, the computer system determines the ACM and ABGM associated with product B for buyer group A, and the corresponding recalculated ACM and ABGM totals (i.e. 100 minus the ACM and ABGM values associated with the buyer group item) for buyer group A. The computer system 50 further divides the ACM and ABGM associated with product B for buyer group A, by the corresponding recalculated ACM and ABGM totals. The $ACM_B$ associated with product B for all buyer groups is 20% (R3C1 in Table 3), and the ABGM associated with product B for buyer group A is 20% (R3C2 in Table 3). The recalculated total ACM associated with buyer group A is 85% (R1C1; Table 4), and the recalculated total ABGM is 60% (See intersection of R1 and C2 in Table 4). Thus, the ECM for product B in buyer group A is equal to 20/85 or 23.5% (R3C1 in Table 5), and the EBGM for product B in buyer group A is equal to 20/60 or 33% (R3C2 in Table 5). The remaining values in Table 5 are similarly calculated.

TABLE 5

| | | C1 | C2 | C3 | C4 | C5 | C6 | C7 | C8 | C9 | C10 | C11 | C12 | C13 | C14 |
|---|---|---|---|---|---|---|---|---|---|---|---|---|---|---|---|
| | | \multicolumn Normalized Category Second Product Mix & Normalized Buyer Group Second Product Mix | | | | | | | | | | | | | |
| | | BG A | | BG B | | BG C | | BG D | | BG E | | BG F | | BG G | |
| | Hygiene Products | Cat. Mix | BG Mix | Cat. Mix | BG Mix | Cat. Mix | BG Mix | Cat. Mix | BG Mix | Cat. Mix | BG Mix | Cat. Mix | BG Mix | Cat. Mix | BG Mix |
| R1 | Total % | 100 | 100 | 100.0 | 100.0 | 100.0 | 100.0 | 100.0 | 100.0 | 100.0 | 100.0 | 100.0 | 100.0 | 100.0 | 100.0 |
| R2 | A | | | 18.8 | 21.4 | 16.7 | 0.0 | 16.7 | 12.5 | 17.6 | 16.7 | 17.6 | 18.2 | 17.6 | 10.0 |
| R3 | B | 23.5 | 33 | | | 22.2 | 28.6 | 22.2 | 25.0 | 23.5 | 16.7 | 23.5 | 27.3 | 23.5 | 20.0 |
| R4 | C | 11.8 | 11 | 12.5 | 14.3 | | | 11.1 | 25.0 | 11.8 | 8.3 | 11.8 | 0.0 | 11.8 | 20.0 |
| R5 | D | 11.8 | 11 | 12.5 | 14.3 | 11.1 | 28.6 | | | 11.8 | 8.3 | 11.8 | 0.0 | 11.8 | 10.0 |
| R6 | E | 17.6 | 11 | 18.8 | 14.3 | 16.7 | 14.3 | 16.7 | 25.1 | | | 17.6 | 36.4 | 17.6 | 20.0 |
| R7 | F | 17.6 | 22 | 18.8 | 21.4 | 16.7 | 0.0 | 16.7 | 0.0 | 17.6 | 33.3 | | | 17.6 | 20.0 |
| R8 | G | 17.6 | 11 | 18.8 | 14.3 | 16.7 | 28.6 | 16.7 | 12.5 | 17.6 | 16.7 | 17.6 | 18.2 | | |
| | Parameter | ECM | EBGM | ECM | EBGM | ECM | EBGM | ECM | EBGM | ECM | EBGM | ECM | EBGM | ECM | EBGM |

The computer system 50 is further configured to determine the preference for members of a particular buyer group to purchase a particular second product using, for example, the following preference index algorithm:

$$PI = EBGM/ECM * 100. \quad (5)$$

Using the data in Table 5, the preference index (PI) for particular buyer groups to purchase a particular second product is shown below in Table 6. For example, to calculate the PI for buyer group A to purchase product B as a second product, the EBGM value (R3C2 in Table 5) for product B in buyer group A is divided by the ECM value (R3C1 in Table 5) of product B in buyer group A, and multiplied by 100. Therefore, the PI for buyer group A to purchase product B as a second product is 33/23.5 or 141.7% (R2C1 in Table 6). The remaining values in Table 6 are similarly calculated.

TABLE 6

| | Hygiene Products | C1 | C2 | C3 | C4 | C5 | C6 | C7 |
|---|---|---|---|---|---|---|---|---|
| | | \multicolumn Preference Index: EBGM/ECM | | | | | | |
| | | A | B | C | D | E | F | G |
| R1 | A | | 114.0 | 0.0 | 75.0 | 94.4 | 103.0 | 56.7 |
| R2 | B | 141.7 | | 128.6 | 112.5 | 70.8 | 115.9 | 85.0 |
| R3 | C | 94.4 | 114.5 | | 225.0 | 70.8 | 0.0 | 170.0 |
| R4 | D | 94.4 | 114.5 | 257.1 | | 70.8 | 0.0 | 85.0 |
| R5 | E | 63.0 | 76.3 | 85.7 | 150.3 | | 206.1 | 113.3 |
| R6 | F | 125.9 | 114.0 | 0.0 | 0.0 | 188.9 | | 113.3 |
| R7 | G | 63.0 | 76.3 | 171.4 | 74.7 | 94.4 | 103.0 | |

Thus, the PI shown in Table 6 indicates the following. A member of buyer group A (which by definition has purchased product A) is more likely to also purchase products B and F because their PI value of 141.7 (R2C1) and 125.9 (R6C1) is greater than 100. Similarly, a member of group A is less likely to purchase products C, D, E and G because their PI of 94.4 (R3C1), 94.4 (R4C1), 63.0 (R5C1) and 63.0 (R7C1) is less than 100. This information can then be used to assign shelf space positions for a second product which has a relatively higher preference index as compared to the PI of other potential second products positions closer to the position of the defining or first product. Alternatively, as between two products, the information is used in assigning an amount of retail shelf space to each of the two products based on a comparison of the PI of the two products. In addition, the information is used for determining a common characteristic of products with higher preference indices and assigning shelf space to selected products which also have the common characteristic.

The intelligent self space management method and system can be applied in any number of scenarios. For example, in one embodiment, the retailer can apply the method and system to optimize allocation of shelf space among products from various manufacturers, including competitors, to maximize return to the retailer. In another embodiment, shelf space allocated to various products for a single vendor is dynamically optimized to maximize profits for the retailer and/or the vendor, possibly in combination with special financial incentives from the vendor to the retailer. In both embodiments, an optimization program within the system repeatedly analyzes sales data (e.g., obtained from a database receiving real-time point of sale information) and considers profit margins, vendor incentives, previously negotiated contracts, available inventory, and other information to provide directions to stockers on how to place goods on the shelves to maximize profits or to achieve other predetermined goals.

In one embodiment, information from the local database 35 and the server 40 can be fed into computer system 50 to explore the relationship between the preference index and current price settings and shelf space allocations. By exploring this relationship, profits can be improved by predicting the effect of changes in price and/or shelf space allocations. Vendor information and incentives are also considered, which may change at any time (e.g., price per unit, coupon discounts, etc.). For example, the relationship may predict that an increase in shelf space for Product A would increase sales of Product A without seriously decreasing sales of Product B, or that profits from the sale of Product A could be increased by increasing the price if the product were more prominently displayed by increasing shelf space allocation or if new coupons from the vendor were made available to consumers. Gains in profits from sales of Product A would be compared to losses in sales for Product B (or other products) affected by the proposed changes in Product A shelf space allocation or pricing strategy.

Based on optimizing the choices of shelf space or price or other variables based on consideration of the sales data and other information, the computer system 50 will make recommendations to stockers concerning the shelf space allocation of goods (or the shelf space allocation could be automated in properly equipped vending environments). Recommendations may also be made about the sales price of the goods and coupons offered in the store through on-site coupon dispensers or other means (including electronic coupons made available to a consumers account by swiping a loyalty card through a card reader associated with the product in question, and including targeted coupons for particular consumers tied to a consumer database through s smart card or loyalty card).

In another embodiment, a shelf space optimization program is used to adjust shelf space allocation to maximize sales during a promotional event.

In yet another, embodiment, customers make purchases at a point of sale, such as a check out station in a grocery store. The purchase of goods, typically identified by scanning, generates sales data that is stored in a sales database containing information such as product type, quantity, price paid, coupons used, loyalty card data, current location on shelf and location relative to competing products, a prominence factor (ranking relating to the visibility on the shelf and extent of shelf space occupied), etc. Sales database information can be used to update or refine a predictive model of consumer behavior. For example, new sales data may indicate that customers are more likely to purchase a given product at the current price than had been anticipated, allowing the model to be refined.

Referring now to FIG. 2, there is shown an operation embodying aspects of the invention. The invention includes the steps of defining a product category, collecting consumer sales transaction data relating to one or more products in the product category, selecting or identifying a first product in product category, defining buyer groups, collecting data regarding the purchasing patterns of the buyer group, determining a preference index that indicates the preference of consumers to purchase one or more products with the first product, and further determining as function of the preference index the amount of shelf space to allocate for the one or more products, the position of the one or more products relative to the first product, and/or the relationship between products with a high PI relative to other products in a buyer group.

As shown in FIG. 2, an interested party, such as a retailer, defines a category of products at step 120 based on one or more shared characteristics among two or more products. At step 130 the retailer defines one or more buyer groups, where the buyer group represents a group of buyers for a particular product who have purchased at least one unit of a product from the defined category in the past year (or other arbitrary time period). At step 140, the retailer collects consumer sales transaction data relating to the buyer group and the defined product category.

In one operation of a preferred embodiment of the invention, the ACM for each product in the category is determined at step 150. The ACM is the portion that the volume of transactions for each product in the product category represents to total product transactions in the category.

At step 160 the retailer obtains the ABGM for each product purchased by members of a particular buyer group. The ABGM is the portion that the volume of transactions for each product by a particular buyer group represents to the total product transactions by the particular buyer group. At step 170, the retailer sorts the buyer group data to exclude ACM and ABGM values from each buyer group that corresponds with the particular product that defines the buyer group. At step 180, the retailer then normalizes, or re-shares, the sorted data to obtain the EBGM and ECM for each product that remains in each buyer group after step 170. At step 190 the retailer determines the PI by the ratio of EPGM to ECM. multiplied by 100. (See Eq. 5).

After calculating the preference index at step 190, the retailer can perform any combination of three alternatives. At alternative step 200, the retailer determines the amount of shelf space to allocate for the first and second products as a function of the PI value. More total space for the two products can be allocated when the corresponding PI value is substantially greater than 100%, or less combined space can be allocated for product pairings having relatively low PI values. At alternative step 210, the retailer determines a distance to position the second product from the first product as a function of the PI value, such that the recommended distance between the products is inversely proportional to the PI value, to encourage close proximity of product pairs that can result in a synergistic increase in sales volume. Furthermore, at alternative step 220, the retailer examines the products in buyer groups with higher PI values, relative to other products in the category, to determine if there are characteristics, other than those that define the category, that are preferred by members of a particular buyer group.

In another alternative (not shown), the retailer or manufacturer can offer product promotions to exploit relatively high PI values. For example, assuming a PI value greater than 100% for wet wipes and disposable gloves from a common manufacturer, an in-store coupon may be offered for a discount in the disposable gloves and made available near the wet wipes. Additionally or alternatively, the gloves may be provided for sale in an in-aisle display case adjacent the wet wipes section.

In one embodiment of the method and system described above, retailers obtain objective data from a third party (e.g., IRI or AC Nielsen) grouped in a way that can be used to show retailers which of two or more proposed shelf space allocation systems will be most profitable in terms of consumer buying patterns. Furthermore, a computer program, for example, can be used to structure buyer group purchase information from a household panel database to compare two or more shelf space allocation models and select the model that should maximize product volume by aligning shelf space allocation with retailer purchase behavior. Accordingly, product volume sold can be maximized by virtue of providing consumers with a convenient allocation of product on the shelves that generally groups a first product with a second product that is more likely to be purchased by buyers of the first product. This grouping is not based on guesswork or mere assumptions, but on trends extracted from recognized consumer databases.

Although described in connection a with an exemplary retail environment, the invention is operational with numerous other commercial or non-commercial environments or configurations. The retail environment is not intended to suggest any limitation as to the scope of use or functionality of the invention.

An example of allocating shelf space as a function of the preference index will now be discussed by reference to Table 6. Assume that there is 10 feet of shelf space available for two products, B and F, adjacent to a first product A. The PI for buyer group A to purchase product B as a second product is 141.7, and the PI for buyer group A to purchase product F as a second product is 125.9%. The space that is allocated for product B as compared to the space allocated for product F can be determined by comparing their preference indices. For example, the algorithm may be determined by the preference index for each product over the total indices. Thus, for product B, $PI_B/(PI_B+PI_F)]*10$ feet=[141.7/(141.7+125.9)]*10 feet, or 5.3 feet.

Also for product F, $[PI_F/(PI_B+PI_F)]*10$ feet=[125.9/(141.7+125.9)]*10 feet, or 4.7 feet.

The calculated distances need not be applied with strict numerical precision but can be used to make relative adjustments in shelf space allocation. The calculations can be further modified to include normalization factors to account for the differences in product size, price, and typical turnover. For example, high bulk goods such as diapers may require substantially more space than small volume goods such as wet wipes or baby food. Likewise, higher priced goods such as jewelry may require substantially less shelf space than lower cost items of similar size. However, quantitative calculations can be done according to the present invention, with or without additional normalization factors, to recommend relative improvements in shelf space to exploit discovered synergy in sales between pairs of products.

In one embodiment, PI values are used to make relative adjustments to planograms of shelf space allocation systems that have been developed without the aid of the present invention. Planograms are used to achieve an approved arrangement of products on a shelf, fixture, or display. By using computed PI values to determine the product arrangement for a particular shelf, fixture, or display, planograms can be enhanced to objectively recommend increases in the relative amount of shelf space for products who have a relatively higher PI than other products competing for the same shelf space. For example, referring to Table 6 above, if second products B and F are arranged near a first product A, it will be discovered that the PI for product B (114) is greater than the PI for product F (103). Thus, this discovery can be used as a basis for modifying an existing planogram developed without the invention, to recommend a relative increase in the space allocated for product B.

In another embodiment, one or more of the other products which have a relatively higher PI, as compared to the PI of the other remaining products, can be assigned shelf space positions which are closer to the position of the first product. For example, referring to Table 6 above, the preference indices for buyer group B for products A thru G are as follows: A (141.7), C (128.6), D (112.5), E (70.8), F (115.9), and G (85.0). Thus, the products can be assigned shelf space in the order A-C-F-D-G-E; where A is the closest to the first product (i.e. product B) and F is the furthest from the first product.

Furthermore, the distance that the second product is placed from the first product may depend on the value of the preference index. In one embodiment, the product having the greatest preference index is placed immediately adjacent to the first product. Thus, continuing with the example of Table 6, if there is 10 feet of shelf space available adjacent to the first product A, product B can be allocated space immediately adjacent to product A's shelf space, and product C should be allocated shelf space 5.3 feet away from product A's shelf space.

In addition to determining space allocation, the PI index may be used to determine whether there are particular characteristics that certain buyer groups prefer. By examining the products in buyer groups that have a high PI, relative to other products in the category, the retailer examine the product for characteristics, other than those that define the category, that are common between the product with higher PI values. For example, referring to Table 6 above, the preference index for buyer group A is highest for products B and F, with PI values of 141.7 and 125.9 respectively. Further, examination of the two products may reveal that both products were manufactured by a common manufacturer such as Kimberly-Clark Corporation, or may find that both products have similar color schemes or packaging motifs. Thus, when allocating shelf space the retailer may choose to give priority to products that have the additional characteristic of being manufactured by Kimberly-Clark Corporation or that share other identified characteristics that appear to result in a increased PI value.

It is to be understood that the above functions for allocating shelf space amount and product position are illustrative, and that the PI may be incorporated into other functions used to determine the amount of space and/or position to allocate for products on shelves.

OTHER EMBODIMENTS

Intelligent management of shelf space allocation of products can include dynamic allocation methods, in which the shelf space allocation employed is regularly modified based on analysis of sales data to optimize returns. Dynamic intelligent management of shelf space allocation can, for example, result in reallocations of product distributions on shelves responsive to temporary promotions to take advantage of temporary changes in price or incentives to purchase, doing so according to mathematical analyses designed to achieve objectives for increased sales, increased profits to the retailer, increased profits to the retailers and a particular vendor cooperating with the retailer, and so forth. The adjustments to the distribution of products on the shelf responsive to the Intelligent Shelf Space Management System can be made manually by stockers or can include a degree of automation, including electronic signals (e.g., liquid crystal displays or infrared signals) showing where goods are to be placed on the shelves, or including conveyors or robot-like features to physically move products to desired locations.

Profit optimization using the Intelligent Shelf Space Management System can further be enhanced with dynamic pricing, wherein the offered price of a good can be automatically adjusted to maximize profits, increase sales or achieve other objectives. For example, the price of one or more items on a shelf may be electronically displayed, and the displayed price (as well as the price to be charged at the point of sale) may be automatically adjusted during a period of time as directed by an optimization program. Alternatively, a fixed base price may be displayed, but variable discount coupons may be offered, wherein an electronically controlled display means shows the dynamically variable discount offered and a coupon dispenser with a built-in printer provides the coupon if a customer accepts it. Fuzzy logic and artificial intelligence systems may be used to find improved pricing systems In general, the Intelligent Shelf Space Management System can be coupled with dynamic pricing such that both the physical allocation of goods on a shelf as well as the pricing of the goods are adjusted by (or the subject of recommendations for adjustment made by) the Intelligent Shelf Space Management System.

To prevent perceived unfairness when a price is dynamically changed, customers who have been in the store for a fixed period of time such as 1 to 2 hours after a price change could be charged the lowest of the two or more prices that have been available during that interval. The price displayed when the product is taken off the shelf can also be locked in (especially against a later price increase) by the use of means to register the price at that moment for the consumer, such as the "Easi-Order" hand-held device used by Safeway, Inc. (see "Internet Retailing" in Euromonitor, January 2000), the devices of Digicomp Research Corp. (see WO 93/04449), portable data collection devices mounted on shopping carts as disclosed in U.S. Pat. No. 5,821,513; or the devices of U.S. Pat. No. 5,630,068.

Dynamic shelf space allocation and dynamic pricing can also be used to conduct consumer studies on the effect of shelf space allocation and pricing on purchase decisions.

In another embodiment, the Intelligent Shelf Space Management System is adapted to automatically reconfigure shelf space allocations to optimize sales performance during particularly seasons of the year. For example, consumer sales data and other marketing research information may point to different shelf space allocation needs during Christmas shopping season than during other times of the year. The Intelligent Shelf Space Management System can consider seasonal effects in its sales predictions and direct adjustments to shelf space allocations seasonally.

1. Virtual Shopping Technologies and Related Marketing Research Tools

While POS data and household panel data are useful in many embodiments of the present invention, obtaining meaningful data on the impact of alternative shelf arrangements and shelf space allocations of products typically requires labor-intensive, time-intensive studies when done in an actual retail setting. A more rapid technique employs computer generated tools to determine the impact of shelf sets on customer behavior. Such systems include the Virtual Shopping tools of Allison Research Technologies (hereafter ART) of Atlanta, Ga. This form of market research includes displaying a computer image of a product or suite of products to a consumer and obtaining a response input from the consumer that is requested, received, and stored via a computer interface. Such techniques can be used to simulate different shelf space allocations of products and then determine the response of the consumer. Related computer-assisted marketing tools that can also be applied to the present invention include the Virtual Emporium of Santa Monica, Calif., which initially offered consumers the merchandise selection of a two-million-square-foot mall in a 2,500-square-foot neighborhood store (see "Virtual Emporium—A New Shopping Experience," at the Annual Conference of the Association for Consumer Research, Oct. 16-19, 1997, Denver, Colo., in *Advances in Consumer Research*, Vol. 25, ed. J. W. Alba and H. W. Hutchinson, Provo, Utah: Association for Consumer Research, 1998, pp. 60-61).

Virtual shopping technologies are further described in "Virtual Shopping: Breakthrough in Marketing Research" by Raymond R. Burke, *Harvard Business Review*, Vol. 74, No. 2, March-April 1996, pp. 120-31, abstracted online at http://www.hbsp.harvard.edu/products/hbr/marapr96/art_virtual.html.

Other computer-assisted marketing tools of us in the present invention are described by J. Lindsay et al., "The Historic Use of Computerized Tools for Marketing and Market Research: A Brief Survey," Document 6359D at IP.com, Dec. 27, 2001 (archived at http://search.ip.com/publication_viewer.jsp?pubID=IPCOM000006359D and at http://wwwjefflindsay.com/market-research.shtml).

2. Models for Determination of Product Interactions and Cross-Elasticity

Any known model for predicting the impact of shelf space, product promotions, or other factors on the sales of a particular product can be employed as a tool in the Intelligent Shelf Space Management System. Exemplary models include that of Timothy L. Urban, "An Inventory-Theoretic Approach to Product Assortment and Shelf-Space Allocation, *Journal of Retailing*, Vol. 74, No. 1, 1998, pages 15-35, which discusses the integration of existing inventory-control models, product assortment models, and shelf-space allocation models to estimate the demand for a product or products as a function of several factors, including the existing inventory level. The approach of Urban can be incorporated in the Intelligent Shelf Space Management System to consider the change in consumer demand that can occur due to changes in the details of the shelf-space handling of the product and related products during a promotion or during other times as well. Cross-elasticity (an expression of an interaction in demand between two products) can also be included in Urban's model.

The Intelligent Shelf Space Management System can also include calculation models based also on Urban's earlier work, T. L. Urban, "A Mathematical Modeling Approach to Product Line Decisions," *Journal of Marketing Research*, Vol. 6, No. 1, 1969, pages 40-47, which provides a means to determine which products should be included in a product line based on a polynomial formula to model product demand as a function of price, advertising, and distribution, with main and cross-elasticities of marketing variables considered, with an iterative search routine recommended for solution. Examples of studies showing means of estimating cross-elasticity coefficients are reviewed by R. C. Curhan, "Shelf Space Allocation and Profit Maximization in Mass Retailing," *Journal of Marketing*, Vol. 37, 1973, pages 54-60, and R. C. Curhan, "The Relationship Between Shelf Space and Unit Sales in Supermarkets," *Journal of Marketing*, Vol. 36, 1972, pages 406-412.

Cross-elasticity can be modeled to include asymmetry in demand such as a change in price of a high-priced brand will have a more dramatic effect on market share of a low-price brand than a change in price of the low-price brand will have on the market share of the high-price brand. Cross-elasticity can also be modeled to include the neighborhood price effect: the observation that brands that are closer to each other in price have larger cross-price effects than brands that are priced farther apart. Cross-elasticity can also be modeled to include other known effects, such as those disclosed, for example, by R. Sethuraman, V. Srinivasan, and D. Kim, "Asymmetric and Neighborhood Cross-Price Effects: Some Empirical Generalizations," *Marketing Science*, Vol. 18, No. 1, 1999. Such other effects include the role of the number of competing products in a category, because cross-price effects tend to be greater when there are fewer competing brands in the product category. The effect of adding new products, or product proliferation, on demand can also be modeled, for example, based on the work of B. L. Bayus and W. P. Putsis, Jr., "Product Proliferation: An Empirical Analysis of Product Line Determinants and Market Outcomes," *Marketing Science*, Vol. 18, No. 2, 1999. Bayus and Putsis propose a three-equation simultaneous system to estimate market outcomes of a firm's product-line decisions. In particular, they specify market share, price, and product line length equations, which are estimated by three-stage least squares. The effect of adding a new product line on the sales of other products can then be estimated.

The Intelligent Shelf Space Management System can use cross elasticity factors to predict not only how shelf space allocation and promotions will increase sales of the promoted product, but how they will affect sales of other products as well, including products in other categories or products from other manufacturers or products that might not seem related at first glance.

Other models can be used that incorporate cross-elasticity, including the work of M. Corstjens and P. Doyle, "A Model for Optimizing Retail Space Allocations," *Management Science*, Vol. 27, No. 7, 1981, pages 822-833. Other modeling approaches of potential value when incorporated into the Intelligent Shelf Space Management System include multi-item inventory models in general, and specific models such as the following:

3. The model of F. S. Zufryden, "Dynamic Programming Approach for Product Selection and Supermarket Shelf-Space Allocation," *Journal of the Operational Research Society*, Vol. 37, No. 4, 1986, pages 413-422, which can be used to optimize the selection of products allocated to shelf-space units in supermarkets, accounting for space elasticity, cost of sales, and potential demand-related marketing variables.

4. The model of Bultez and Naert, which is similar to that of Corstjens and Doyle, but uses marginal analysis based on a general theoretical formulation. They consider interdependencies prevailing across and within product-groups. See A. Bultez and P. Naert, "S.H.A.R.P.: Shelf Allocation for Retailers' Profit," *Marketing Science*, Vol. 73, No. 3, 1988, pages 211-231.

5. The model of Anderson and Amato for simultaneous analysis of product assortment and shelf-space allocation problems. See E. E. Anderson and H. N. Amata, "A Mathematical Model for Simultaneously Determining the Optimal Brand-Collection and Display-Area Allocation," *Operations Research*, Vol. 22, No. 1, 1974, pages 13-21.

6. The model of Borin et al. as described in N. Borin, P. W. Farris, and J. R. Freeland, "A Model for Determining Retail Product Category Assortment and Shelf Space Allocation," *Decision Sciences*, Vol. 25, No. 3, 1994, pages 359-384, and in N. Borin and P. W. Farris, "A Sensitivity Analysis of Retailer Shelf Management Models, *Journal of Retailing*, Vol. 71, No. 2, 1995, pages 153-171, which integrates product assortment and shelf-space allocation analyses including cross-elasticity effects of substitute items and the effect on demand of products when other products are not included in the assortment. A solution strategy is suggested in the work as well ("simulated annealing").

7. The model of Baker and Urban for the effect of displayed inventory on product demand, disclosed in R. C. Baker and T. L. Urban, "A Deterministic Inventory System with an Inventory-Level-Dependent Demand Rate," *Journal of the Operation Research Society*, Vol. 39, No. 9, 1988, pages 823-831. See also R. C. Baker and T. L. Urban, "Single-Period Inventory Dependent Demand Models," *Omega*, Vol. 16, No. 6, 1988, pages 605-607.

Solution techniques for these models can include any of the ones taught or recommended in the respective references, or more modern techniques, including neural networks, fuzzy logic systems, genetic algorithms, and the like. Use of scanner data, consumer household data, or other data sources to provide empirical models for demand or other factors to be used in computations for the Intelligent Shelf Space Management System can be analyzed using known methods such as generalized linear models such as regression, as well as log-linear, logit, and probit models. An example is discussed at www2.chass.ncsu.edu/garson/pa765/logit.htm.

The Intelligent Shelf Space Management System can also include models to predict how a promotion expands short-run and long-run category demand, which can be based on work such as that disclosed by V. R. Nijs et al., "The Category-Demand Effects of Price Promotions," *Marketing Science*, Vol. 20, No. 1, 2001. Nijs et al. examine category-demand effects of consumer price promotions across 560 consumer product categories over a 4-year period. The data describe national sales in Dutch supermarkets and cover a broad marketing mix, i.e., prices, promotions, advertising, distribution, and new-product activity. They focus on the estimation of main effects, such as the dynamic category expansive impact of price promotions, as well as the moderating effects of marketing intensity and competition on short- and long-run promotional effectiveness. Multivariate time-series analysis is used to disentangle short- and long-run effects. First, they conduct a series of tests to determine whether or not category demand is stationary or evolving over time. The results are incorporated in the specification of vector-autoregressive models with exogenous variables (VARX models). The impulse-response functions derived from these VARX models provide estimates of the short- and long-term effects of price promotions on category demand. These estimates, in turn, are used as dependent variables in a series of second-stage regressions that assess the explanatory power of marketing intensity and competition. Results are given in the form of empirical generalizations on the main effects of price promotions on category demand in the short and the long run and through statistical tests on how these effects change with marketing intensity and competition. The findings generate an overall picture of the power and limitations of consumer price promotions in expanding category demand.

Nijs et al. report that category demand is predominantly stationary, either around a fixed mean or a deterministic trend. Although the total net short-term effects of price promotions are generally strong, with an average elasticity of 2.21 and a more conservative median elasticity of 1.75, they rarely exhibit persistent effects. Instead, the effects dissipate over a time period lasting approximately ten weeks on average. By contrast, the successful introduction of new products into a category is more frequently associated with a permanent category demand increase. Thus, a model that relates demand to promotions can include factors that depend upon the nature of the product, such as a new product category, a new product in an existing category, an improved product, or an existing product, using a menu of tailored relationships between promotion and demand that depend on the nature of the product.

The impact of advertising on sales can be predicted using any suitable method or model. Such predictions can also include estimates based on Internet advertising or other alternative media sources, using, for example, the work of F. Zufryden, "Predicting Trial, Repeat, and Sales Response from Alternative Media Plans," *Journal of Advertising Research—Special Classic Issue*, Vol. 40, No. 6, November/December 2000, as well as related works of Zufryden or others, including:

8. X. Drèze and F. Zufryden, "A Web-Based Methodology for Product Design Evaluation and Optimisation," *Journal of the Operational Research Society*, October 1998, Vol. 49, No. 10, pp. 1034-1043.

9. F. Zufryden, "A Model for Relating Advertising Media Exposures to Purchase Incidence Patterns," *Management Science*, Vol. 33, No. 10, October 1987.

10. F. Zufryden, and G. Tellis, "Tackling the Retailer Decision Maze: Which Brands to Discount, How Much, When and Why", *Marketing Science*, Vol. 14, No. 3, 1995.

11. F. Zufryden and J. H. Pedrick), "Measuring the Competitive Effects of Advertising Media Plans," *Journal of Advertising Research*, November/December 1993. Zufryden, Fred, "The WNBD: A Stochastic Model Approach for Relating Explanatory Variables to Consumer Purchase Dynamics," the *International Journal of Research in Marketing*, Vol. 8, 1991.

What is claimed:

1. A computer implemented method of allocating retail shelf space for a product segment based on sales data indicating past transactions of consumers of products in the product segment, said method comprising:
    defining a product segment of products based on a shared characteristic of the products;
    defining a plurality of buyer groups, each group based on consumers who purchase a first product from said defined product segment within a defined time period;
    for each buyer group, determining a preference for the consumers in each buyer group to purchase a second product from the defined product segment via a computer processor, said second product being other than the first product and said second product serving a different primary purpose than said first product, said determining comprising calculating a preference index relating the first product and the second product as a function of the sales data; and
    allocating the retail shelf space for the defined product segment of products based on the determined preference,
    wherein determining the preference comprises calculating the preference index as a function of an expected product segment mix and an expected buyer group mix, wherein the expected product segment mix corresponds to a percentage of the second product purchased with respect to the total number of products purchased within the product segment after excluding the first products, wherein the expected buyer group mix corresponds to the percentage of the second product purchased with respect to the total number of products purchased by the buyer group after excluding the first products.

2. The method of claim 1 wherein said sales data comprises point of sale data, household panel data, commercial consumer sales data, and/or data stored on a computer readable medium.

3. The method of claim 2, wherein said sales data further comprises virtual shopping data.

4. The method of claim 1 wherein said defined time period is one year.

5. The method of claim 1 wherein allocating the retail shelf space comprises assigning shelf space positions which are closer to the position of the first product to one or more of the other products which have a relatively higher preference as compared to the preference of the other remaining products.

6. The method of claim 1 further comprising calculating the preference index for each of the other products in the product segment relative to the first product as a function of the sales data, wherein allocating the retail shelf space comprises, as between two products, assigning an amount of retail shelf space to each of the two products based on a comparison of the preference indices of each of the two products.

7. The method of claim 6 wherein allocating the retail shelf space comprises determining a common characteristic of products with higher preference indices via the computer processor and assigning preferentially shelf space to selected products which have the common characteristic.

8. The method of claim 1 wherein the step of allocating the retail shelf space based on said preference increases sales for retailers.

9. A computer implemented method of allocating retail shelf space for a product segment of products based on sales data indicating past purchases of consumers of products in the product segment, said method comprising:
    defining a product segment of products based on a shared characteristic of the products;
    defining a plurality of buyer groups, each group based on consumers who purchase a first product in said product segment within a defined time period;
    for each buyer group, determining a preference for the consumers in each buyer group to purchase each of the other products within the product segment via a computer processor, said determining comprising calculating a preference index as a function of the sales data for each of the other products relative to the product that defines the buyer group, wherein at least one of each of the other products serves a different primary purpose than the first product;
    predicting a sales impact based on the preference for the consumers in each buyer group to purchase each of the other products within the product segment; and
    allocating the retail shelf space based on said predicted sales impact,
    wherein determining the preference comprises calculating the preference index as a function of an expected product segment mix and an expected buyer group mix, wherein the expected product segment mix corresponds to a percentage of the other products purchased with respect to the total number of products purchased within the product segment after excluding the first products, wherein the expected buyer group mix corresponds to the percentage of the other products purchased with respect to the total number of products purchased by the buyer group after excluding the first products.

10. The method of claim 9 wherein allocating the retail shelf space based on said predicted sales impact achieves a sales objective and/or a profitability objective.

11. The method of claim 9 further comprising modifying a planogram to allocate shelf space by comparing the determined preferences of a plurality of buyer groups.

12. The method of claim 9 wherein said sales data comprises one or more of the following: point of sale data, household panel data, shopping studies, and commercial consumer sales data.

13. The method of claim 9 wherein said shared characteristic is selected from one or more of the following: price; a manufacturer name; a brand name; and an identifiable classification.

14. A system for allocating retail shelf space for a product segment of products based on sales data indicating past transactions of consumers of products in the product segment, said system comprising:
    data collection instructions for collecting data relating to purchases by a plurality of defined buyer groups from within a defined product segment, wherein the product segment is defined based on a shared characteristic of the products, and wherein each of the groups is defined based on consumers who purchase a first product in said product segment within a defined time period;

a database for collecting sales data; and a computer system which, for each buyer group, determines a preference for the consumers in each buyer group to purchase a second product within the product segment, said second product being other than the first product of the buyer group and said second product serving a different primary purpose than said first product, wherein the computer system calculates a preference index relating the first product and the second product as a function of the sales data, said computer system further allocating the retail shelf space based on said determined preference, wherein determining the preference comprises calculating the preference index as a function of an expected product segment mix and an expected buyer group mix, wherein the expected product segment mix corresponds to a percentage of the second product purchased with respect to the total number of products purchased within the product segment after excluding the first products, wherein the expected buyer group mix corresponds to the percentage of the second product purchased with respect to the total number of products purchased by the buyer group after excluding the first products.

15. The system of claim 14, wherein the database is further configured for storing inventory data for a plurality of point of sale retail locations.

16. The system of claim 14, wherein the database is further configured for storing, retrieving, and/or deleting information relating to consumer sales data for one or more products and/or the preference for the consumers in each buyer group to purchase each of the other products within the product segment, other than the first product.

17. The system of claim 14 wherein the computer system is responsive to the data collection instructions and/or the database for determining a preference for the consumers in each buyer group to purchase each of the other products within the product segment, other than the first product.

18. The system of claim 14 further comprising a server connected to the computer system via a data communication network, said server storing and retrieving information relating to consumer sales data for one or more products and/or quantified sales interaction parameters between the first and second products.

19. The system of claim 18 wherein said server retrieves consumer sales data from one or more of the following: a loyalty card data source; a commercial consumer sales entity (CCSE); a shopping study source; and a computer readable medium.

20. The system of claim 14, wherein the computer system is configured for storing, retrieving, and/or deleting information relating to consumer sales data for one or more products.

21. The system of claim 14, wherein the determined preference is a function of quantified sales interaction parameters further including one or more of the following: an actual product segment mix and an actual buyer group mix (ABGM).

22. The system of claim 14, wherein the computer system is further configured to present for viewing and/or printing the information relating to consumer sales data for one or more products.

* * * * *